July 18, 1967

R. W. MacMILLAN ETAL 3,331,109

SAFETY LATCH FOR HOOKS

Filed June 2, 1966

INVENTORS

ROBERT W. MacMILLAN
SYLVESTER MROZEK &
RONALD J. PEARCE
BY
*Harvey S. Boyd*
ATTORNEY

United States Patent Office 3,331,109
Patented July 18, 1967

3,331,109
SAFETY LATCH FOR HOOKS
Robert W. MacMillan, Sylvester Mrozek, and Ronald J. Pearce, Sault Sainte Marie, Mich., assignors to the United States of America as represented by the Secretary of the Army
Filed June 2, 1966, Ser. No. 554,902
4 Claims. (Cl. 24—241)

The invention described herein may be manufactured and used by or for the Government for governmental purposes without the payment to us of any royalty thereon.

This invention relates to safety latches for load carrying hooks and more particularly to a safety latch having a locking element for locking the latch in an open position, during the loading of the hook, and for subsequently locking the latch in a closed position securing the load on the hook.

A safety hazard exists in the use of double or standard hooks to lift heavy loads that a cable sling carried by the hook can slip off and allow a load to drop. For example, in the case of double hooks when more than one sling is used, or when the load momentarily engages an obstruction causing slack in the sling, a dangerous situation exists resulting in a safety hazard.

Accordingly, it is an object of this invention to provide a safety latch for a hook to insure that, should slack develop in a load line carried by the hook, the line will not slip off the hook.

It is another object to provide a safety latch adaptable for use on a wide variety of hooks pivotally mounted on the stem of said hook and capable of automatically closing in response to the release of a locking element, said locking element acting to lock the latch in either an open or closed position.

It is still another object to provide a safety latch for hooks, incorporating simplicity of operation, which will allow an operator to lock a sling, or other load line, on a hook through the use of one hand to move the latch from the open to the closed position.

It is a further object to provide a safety latch capable of closing through the movement of a latch lever in response to gravity.

Figure 1:
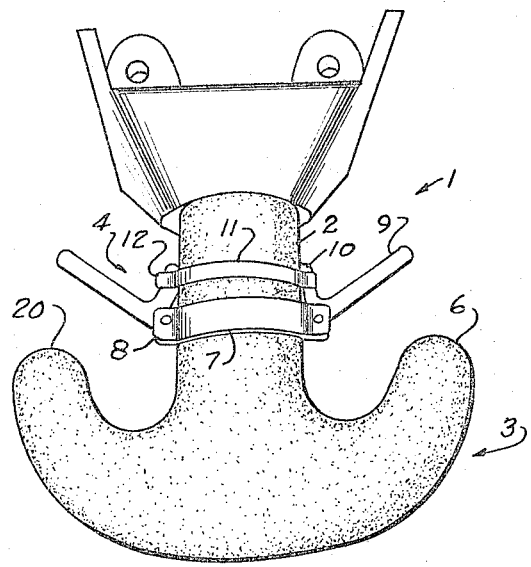
Figure 2:
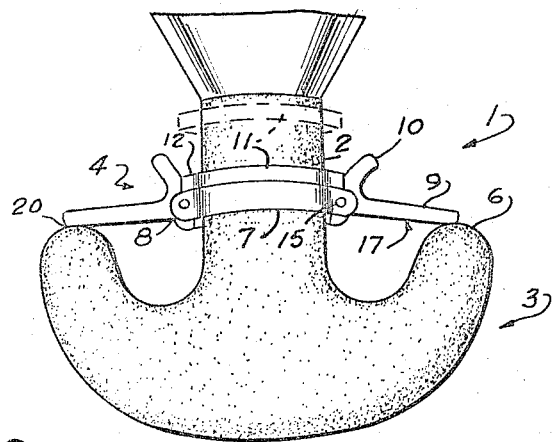

These and other objects will be apparent with reference to the drawings and the following description wherein:

FIG. 1 illustrates the safety latch of this invention mounted on a double hook in an open position; and FIG. 2 illustrates the latch in a closed and locked position and also shows, in phantom, the raised position of the locking element which allows the safety latch to close.

The latch 1 is adaptable for use on the vertical stem 2 of any load carrying hook 3 without modification of said hook. A preferred embodiment may be described as follows:

An L-shaped latch lever 4 is pivotally mounted on the hook stem 2, the pivot point 15 being adjacent the open, load receiving portion 6 of the hook 3. In this embodiment the pivotal mounting is a collar 7 secured in a conventional manner to the hook stem 2, and carrying a lip 8 which pivotally receives the latch lever 4.

The latch lever 4 has a horizontal leg 9 extending from the pivot point 15 to the hook point 20 and a vertical dog leg 10. The vertical dog leg 10 is disposed to point away from the vertical hook stem 2.

Disposed above the pivot point 15, on collar 7, is a locking sleeve 11. The sleeve 11 is slidably mounted on the stem 2. The sleeve 11 has a U-shaped protruding stop 12. The stop 12 receives the end of dog leg 10 to lock the latch in the open position, as shown in FIG. 1, and when the sleeve 11 is raised, as shown in phantom on FIG. 2, the latch lever 4 closes as the horizontal leg 9 pivots about points 5 until it contacts point 20 as shown in FIG. 2.

Locking sleeve 11 is caused to descend the stem 2 until stop 12 is seated between stem 2 and leg 10. This is the locked position of FIG. 2.

Accordingly, an upward force acting from the load line 17 against leg 9 will be met by the wedging action of stop 12 and latch lever 4 will not pivot about point 15 until sleeve 11 is raised.

The safety latch of this invention may be adapted for use with any hook having a stem. In the case of a hook having a vertical stem a load line 17 is placed on the hook 3 when the latch 1 is locked in the open position as shown in FIG. 1. An operator may then raise sleeve 11 with one hand, allowing the latch to close as leg 9 pivots about 15. The locking action may then be achieved by sliding sleeve 11 down stem 2 until the sleeve 11 rests on fixed collar 7 and stop 12 is juxtaposed with leg 10.

We claim:
1. A safety latch for a plural hook having a common stem comprising:
    (a) a collar carried by the stem having oppositely located pintle mountings;
    (b) an L-shaped latching member rotatably mounted in each of said pintle mountings for movement between an open and a closed condition wherein the longer leg of each said latching member spans the entry to each of said plural hooks;
    (c) a sleeve member slidably mounted on the stem above said collar and said pintle members and provided with oppositely located projections adapted to receive the shorter leg of each said latching member when the latching member is in the open condition and upon upward sliding movement to be disengaged from said shorter leg of each said latching member to permit each said latch to rotate to a position closing the entry to each of the plural hooks, said sleeve sliding to a position adjacent said collar when said latch is in a closed condition wherein said projections span the space between the stem and each said shorter leg to maintain said latch in a closed condition.
2. A safety latch for a hook having a stem comprising:
    (a) an L-shaped latch lever having a horizontal and a vertical leg;
    (b) a collar surrounding the stem and including a pintle mounting, connecting the junction of the legs of said L-shaped lever to the stem of the hook, and disposed adjacent the point of the hook, for selectively rotating said lever from a latch open position when the distal portion of said vertical leg is juxtaposed with the stem of the hook to a latch closed position when the distal portion of the horizontal leg rests on the point of the hook;
    (c) a locking sleeve positioned on the stem above said collar including a projection for engaging said vertical leg and maintaining said horizontal leg in an open position relative to the point of the hook; and
    (d) said locking sleeve slidably mounted on the stem of the hook and disposed above said pivotal mounting whereby upon an initial upward displacement of said locking sleeve said projection disengages said vertical leg to permit said horizontal leg to rest on the point of the hook and upon subsequent lowering by gravity said locking sleeve projection engages said vertical leg to maintain the distal end of said horizontal leg in closed position in contact with the point of the hook.
3. A safety latch for a hook having a stem comprising:
    (a) an L-shaped latch lever having a horizontal and a vertical leg, hingedly attached to the stem portion of a hook at a pintle mounting and adjacent the tip of the hook, the horizontal leg extending from the pintle to the tip of the hook, the vertical leg having a distal angular portion extending away from the hook stem and a proximal portion parallel to the hook stem;

(b) a locking sleeve slidably mounted on the stem of the hook and disposed above the pintle mounting and having an upper and a lower position on said stem;

(c) a U-shaped stop means attached to said sleeve and extending outwardly therefrom for receiving the distal portion of said vertical leg when said sleeve is in an upper position and said vertical leg is juxtaposed with the stem of the hook, and for seating said sleeve between the proximal portion of said vertical leg and the stem of the hook.

4. A safety latch for a hook having a stem comprising:
(a) a collar secured to the stem of said hook;
(b) a latch lever hingedly attached to said collar at a pintle mounting and extending from said collar outwardly to the tip of said hook;
(c) an upwardly extending locking dog leg attached to said lever at the pintle and extending away from the stem of the hook;
(d) a sleeve slidably mounted on the stem of the hook and disposed above the collar; and
(e) a leg-receiving locking protrusion secured to said sleeve, having a recessed portion, said protrusion extending outwardly from said sleeve, the recess for receiving the distal portion of said leg when said lever is rotated about the pintle away from the tip of the hook, and said protrusion extending outwardly a sufficient distance to allow said sleeve to rest on said collar when said lever is rotated about the pintle toward the tip of the hook so that said protrusion is slidably seated between said leg and said sleeve.

References Cited

UNITED STATES PATENTS

| 456,137 | 7/1891 | Clary | 24—241 |
| 465,069 | 12/1891 | Reid | 294—110 X |
| 852,285 | 4/1907 | Murray | 24—230.5 X |
| 1,608,563 | 11/1926 | Morin | 70—459 |
| 2,866,247 | 12/1958 | Clegg | 24—232 |

FOREIGN PATENTS

| 720,220 | 12/1931 | France. |
| 49,578 | 7/1921 | Sweden. |

WILLIAM FELDMAN, *Primary Examiner.*

DONALD A. GRIFFIN, *Examiner.*